Patented Feb. 28, 1928.

1,660,366

UNITED STATES PATENT OFFICE.

FRITZ TUTZSCHKE, OF LEIPZIG-SCHONEFELD, GERMANY.

METHOD OF ETCHING PRINTING PLATES AND COMPOSITION OF MATTER FOR USE IN CONNECTION THEREWITH.

No Drawing. Application filed February 17, 1927, Serial No. 169,137, and in Germany February 22, 1926.

My invention refers to a method of etching lithographic printing plates consisting of aluminium or an alloy of this metal. It also includes a composition of matter for use in connection with the new method.

According to the present invention the correct etching of lithographic printing plates made of aluminium or an aluminium alloy is rendered possible by the use of a corrosive agent containing calcium nitrate and potassium dihydrogen phosphate ($KH_2PO_4$).

I have found that by etching aluminium plates or plates consisting of an aluminium alloy with a corrosive agent consisting of or containing calcium nitrate and potassium dihydrogen phosphate I am enabled to obtain perfect etchings.

In practising my invention I have, for instance, used a solution of 100 parts by weight of calcium nitrate and 60 parts of potassium dihydrogen phosphate in 1500 parts of water.

I have further found that in certain cases an addition of gum arabic or of arabine is advantageous, and I have, for instance, added to a solution as above described 50 parts of gum arabic or 5 parts arabine.

Before applying the new corrosive solution I prefer treating the metal plates with grinding sand to which some potassium alum has been added.

Washing of the plates and the preparatory treatment with acid before etching can be dispensed with. Plates treated in accordance with this invention will result in particularly clear prints and can be used for printing very large numbers of copies.

Various changes may be made in the details disclosed in the foregoing specification without departing from the invention or sacrificing the advantages thereof.

I claim:

1. As a new composition of matter for use in preparing aluminium printing plates a watery solution of calcium nitrate and potassium dihydrogen phosphate ($KH_2PO_4$).

2. As a new composition of matter for use in preparing aluminium printing plates a watery solution of calcium nitrate and potassium dihydrogen phosphate ($KH_2PO_4$) in the proportion of 100 parts by weight calcium nitrate and 60 parts potassium dihydrogen phosphate to 1500 parts water.

3. As a new composition of matter for use in preparing aluminium printing plates a watery solution of calcium nitrate and potassium dihydrogen phosphate ($KH_2PO_4$), to which some gum arabic is added.

4. The method of preparing metal printing plates containing aluminium, comprising acting on the plates with a corrosive agent containing calcium nitrate and potassium dihydrogen phosphate.

In testimony whereof I affix my signature.

FRITZ TUTZSCHKE.